United States Patent
Yanagisawa

(10) Patent No.: US 6,816,152 B2
(45) Date of Patent: Nov. 9, 2004

(54) DIGITIZER AND PAGE ACCESS SUPPORT DEVICE

(75) Inventor: Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 10/164,983

(22) Filed: Jun. 7, 2002

(65) Prior Publication Data

US 2003/0030627 A1 Feb. 13, 2003

(30) Foreign Application Priority Data

Aug. 8, 2001 (JP) .................................. 2001-240380

(51) Int. Cl.[7] .............................................. G09G 5/00
(52) U.S. Cl. ................. 345/173; D14/389; 178/18.03
(58) Field of Search ................ 345/173, 901; D14/389; 178/18.03, 18.1; D19/26–34

(56) References Cited

U.S. PATENT DOCUMENTS

| | | | | |
|---|---|---|---|---|
| 5,243,149 A | * | 9/1993 | Comerford et al. | 178/18.03 |
| 5,587,560 A | * | 12/1996 | Crooks et al. | 178/18.03 |
| 5,838,819 A | * | 11/1998 | Ruedisueli et al. | 382/187 |
| 5,909,207 A | * | 6/1999 | Ho | 345/156 |

* cited by examiner

*Primary Examiner*—Amare Mengistu
*Assistant Examiner*—Tom Sheng
(74) *Attorney, Agent, or Firm*—Daniel E. McConnell

(57) ABSTRACT

A digitizer which enables the user to set a collection of forms on a forms set portion and write on any page of the collection of forms with an input pen to input the data regarding the content of writing corresponding to the page, such that a user can efficiently open to a desired page of the collection of forms, is provided for. Additionally, a page turning side depression is provided in a right side frame portion delineating the right side of the forms set portion.

6 Claims, 10 Drawing Sheets

DIGITIZER AND PAGE ACCESS SUPPORT DEVICE

BACKGROUND OF THE INVENTION

1. Field of the Invention

The present invention relates to a digitizer and a page access support device equipped in the digitizer, and more particularly to a digitizer which allows the user to open a desired page in an assembly of papers laid efficiently, and a page access support device equipped in the digitizer.

2. Description of Related Art

A notebook personal computer is equipped with a digitizer in conjunction with a personal computer main unit, whereby the user can input the characters or figures via the digitizer into the personal computer main unit. The digitizer is typically employed in such a way that the user lays a paper-type report (e.g. notebook, or a bundle of papers for writing that are bound at the upper side and can be cut off appropriately, for instance) on a stage portion, opens the report to a page of the notebook, and writes the characters on the page, whereby the characters are left on the page and input as the data into the personal computer main unit. In addition, if the user enters a page number to input the characters, the data of the characters that the user writes on the paper is saved corresponding to the input page.

It is known that for conventional digitizers, when a user desired to open to a predetermined page of the notebook on the digitizer, the user would attempt to open to the page by judging where the desired page is located in the notebook according to one's own estimation, thereby taking some time and labor in order to open to the desired page. This prior process being both less desirable and quite inefficient.

SUMMARY OF THE INVENTION

The present invention comprises a digitizer having a stage portion for laying an assembly of papers which are attached with a page number in an overlying order and bundled to be freely opened at any page number, and a data detecting portion for detecting contents of writing as data corresponding to the page number of a page when a user writes into the page being opened in said assembly of papers on said stage portion. In the present invention a protrusion member is also provided adjacent to a lateral face of thickness for said assembly of papers that are freely turned over on said stage portion, said protrusion member having an ascent section ascending almost obliquely to a layer direction of said lateral face of thickness from a lower end to an upper end in the layer direction of said lateral face of thickness, and said ascent section is provided with an extensive range identifying unit for identifying a range in an extending direction of said ascent section.

It is an object of the present invention to provide a digitizer and a page access support device that allows a user to efficiently open to a desired page in the notebook or book.

The assembly of papers includes, for example, a paper-type report or notebook that is in essence a bundle of writing papers appropriately bound at the upper side and cut off freely (e.g. an ordinary notebook that is bound at the left side and freely opened, a bundle of cut sheets fastened firmly at appropriate position in the left corner or left side by means of a clip or staple, or punched and held loosely by means of a ring, and the printed matter or book that is freely writable, for example). A lateral face of thickness for the assembly of papers that are freely turned over is defined to include the lateral face of thickness other than where the pages can not be turned over due to binding or fastening among the lateral face of thickness for the assembly of papers. The ascent section is ascending almost obliquely from the lower end to the upper end in the layer direction of the lateral face of thickness, or may partly level off or descend.

The extensive range identifying includes, for example, the shape, the structure, colors, and the scale. Moreover, the scale includes a structural scale such as engraving and a visual scale such as numerical value and lines.

In one embodiment of the present invention, (a) the ascent section is a slope ascending monotonously from the stage face of the state portion, and the extensive range identifying means is a color for each range on the slope, or (b) the ascent section has a step structure ascending monotonously from the stage face of the stage portion, and the extensive range identifying means is a horizontal step in the step structure.

In the digitizer, a display portion is disposed adjacent to the protrusion member on the opposite side of the stage portion to the protrusion member as seen from an upper face of the stage portion, and the display portion displays a page number and an indication mark indicating the position of the ascent section in the extending direction which is almost as high as the page with the page number. The digitizer may further comprise a page number input portion for enabling the user to input the page number, and display control means for displaying the page number input into the page number input portion and a corresponding indication mark on the display portion. The digitizer may further comprise a page number indication input portion which accepts an indication of the page number from a computer main unit, and display control means for displaying the page number input into the page number indication input portion and a corresponding indication mark on the display portion.

The digitizer may further comprise a set value input portion for enabling the user to input a total number of pages for an assembly of papers laid on the stage portion as a set value, wherein the display control means controls the position of an indication mark on the display portion, on the basis of the set value for the total number of pages which the user inputs into the set value input portion.

A page access support device of the invention comprises a stage portion for laying at a predetermined position an assembly of papers which are attached with a page number in the overlying order and bundled to be arbitrarily opened at any page number, and a protrusion member provided adjacent to a lateral face of thickness for the assembly of papers that are freely turned over on the stage portion. The protrusion member has an ascent section ascending almost obliquely to a layer direction of the lateral face of thickness in the layer direction of the lateral face of thickness, and the ascent section is provided with extensive range identifying means for identifying a range in an extending direction of the ascent section.

An example of using the page access support device is that for a book having a certain thickness laid on the stage portion such as a desk or table, the user opens a target page of the book efficiently, employing the extensive range identifying means in the ascent section of the protrusion member. The examples of book include an encyclopedia, an atlas, and a telephone directory. The assembly of papers for use with the page access support device is not limited to the book, but may be the collection of forms output from the printer and stored suitably, or the collection of forms bound to be freely writable.

With the page access support device according to another embodiment, (a) the ascent section is a slope ascending monotonously from a stage face of the stage portion, and the extensive range identifying means is a color for each range of the slope, or (b) the ascent section has a step structure ascending monotonously from a stage face of the stage portion, and the extensive range identifying means is a horizontal step of the step structure.

Additionally, the page access support device according to a preferred embodiment of the invention may be constituted as:

(c) the display portion is disposed adjacent to the protrusion member on the opposite side of the stage portion to the protrusion member as seen from an upper face of the stage portion, and the display portion displays a page number and an indication mark indicating the position of the ascent section in the extending direction which is almost as high as the page with the page number;

(d) Further comprising a page number input portion for enabling the user to input the page number, and display control means for displaying the page number input into the page number input portion and a corresponding indication mark on the display portion; or, (e) Further comprising a page number indication input portion which accepts an indication of the page number from a computer main unit, and display control means for displaying the page number input into the page number indication input portion and a corresponding indication mark on the display portion.

Moreover, the page access support device may further comprise a set value input portion for enabling the user to input a total number of pages for an assembly of papers laid on the stage portion as a set value, wherein the display control means controls the position of an indication mark on the display portion, on the basis of the set value for the total number of pages which the user inputs into the set value input portion.

DETAILED DESCRIPTION

The present invention will be described in detail below referring to the embodiment shown in the attached drawings.

Figure 1:
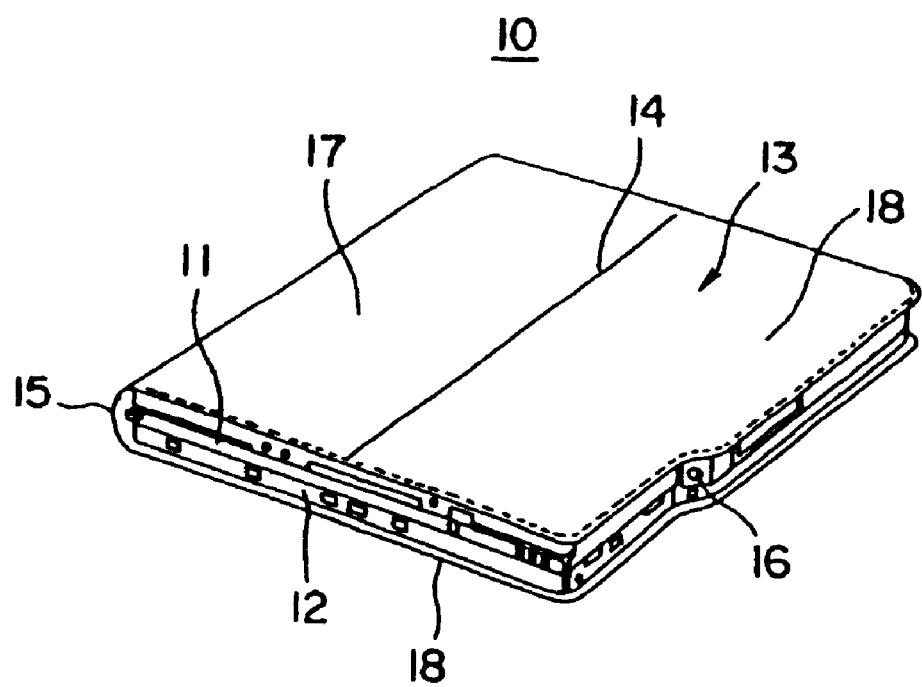
FIG. 1 is a perspective view showing a portable computer in a portable state in a preferred embodiment.

FIG. 1 is a perspective view showing a portable computer 10 in a portable state in a preferred embodiment. The portable computer 10 has a personal computer main unit layer 11 and a digitizer layer 12 which are laid one on top of the other. Comparing the portable computer 10 as shown in FIG. 1 to a book, a cover 13 (such as leather) covers a superposed entity of the personal computer main unit layer 11 and the digitizer layer 12 (hereinafter referred to as a "superposed entity X", this superposed entity X has two end faces on both sides in the layer direction and four thickened faces, viz., a total of six faces) to constitute a cover for the front, reverse and back sides, in which a back portion 15 covers one of the four thickened faces of the superposed entity X (hereinafter referred to as a "back side thickened face B"). The leather cover 13 is divided into almost equal two portions, including a free separation portion 17 that is closer to the back portion 15 and a fixed portion 18 farther from the back portion 15 with a folding line 14 as the boundary in a range corresponding to the front and reverse cover faces. The leather cover 13 can be suitably separated from the superposed entity X in the back portion 15 and the free separation portion 17, but always fixed to the superposed entity X in the fixed portion 18, playing a role of a flexible hinge for linking the personal computer main unit layer 11 and the digitizer layer 12 in freely openable or closable manner. A latch 16 is provided on a thickened face (hereinafter referred to as an "inside thickened face B2") opposite to the back side thickened face B1 in the superposed entity X, and slidably operated to connect or disconnect the digitizer layer 12 with or from the personal computer layer 11 on the inside thickened face B2 of the superposed entity X.

Figure 2:
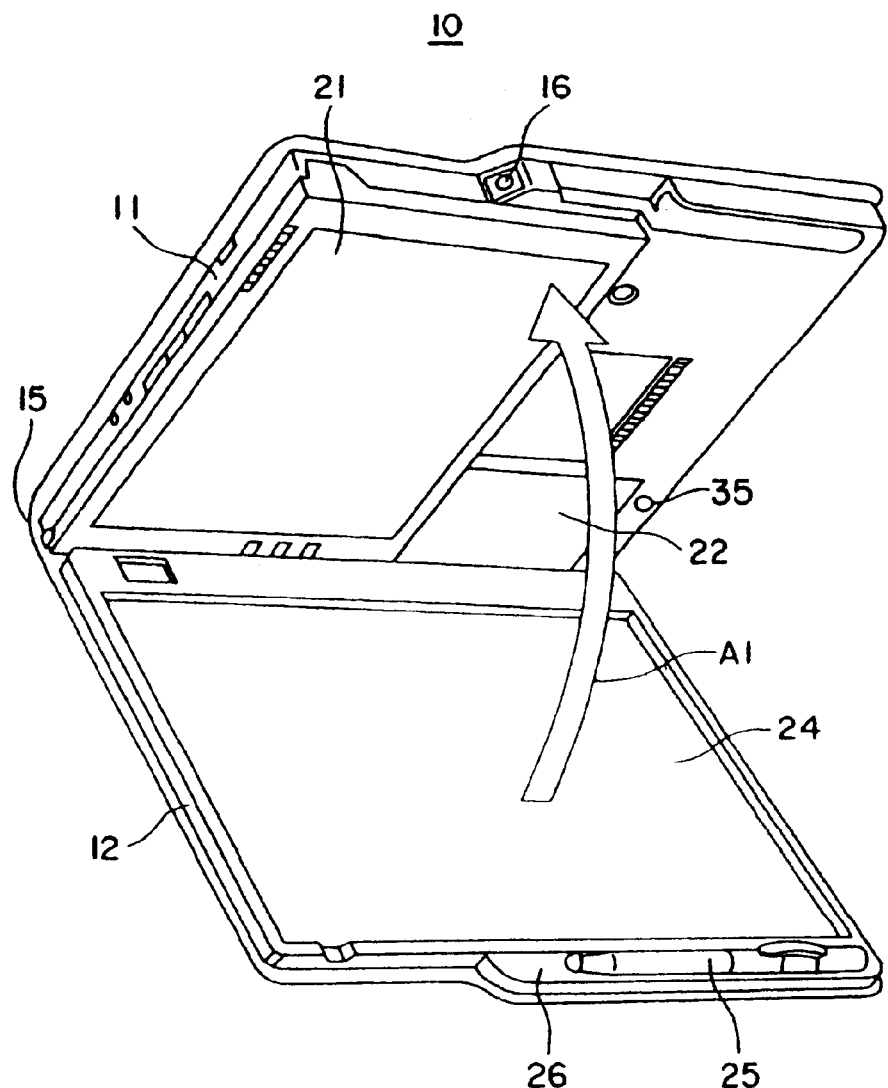
FIG. 2 is a view showing the portable computer that is opened at a predetermined angle from the state of FIG. 1, according to a preferred embodiment.

FIG. 2 is a view showing the portable computer 10 that is opened at a certain angle from the state of FIG. 1, according to a preferred embodiment. In the portable computer 10 of FIG. 1, after the latch 16 is slid to disengage the connection between the personal computer layer 11 and the digitizer layer 12 on the inside thickened face B2, the personal computer main unit layer 11 is opened from the digitizer layer 12 as if a book were opened in the A1 direction in FIG. 2, whereby a liquid crystal display 21 appears on the side of the personal computer main unit layer 11 confronting the digitizer layer 12 and a digitizer 24 appears on the side of the digitizer layer 12 confronting the personal computer main unit layer 11. That is, it will be found that in a superposed state as shown in FIG. 1 (hereinafter referred to as a "superposed state C") between the personal computer main unit layer 11 and the digitizer layer 12, the liquid crystal display 21 and the digitizer 24 are confronted. On the side of the personal computer main unit layer 11, the liquid crystal display 21 occupies half or more of the area of the personal computer main unit layer 11, a battery 22 being detachably equipped in the remaining area. On the side of the digitizer layer 12, a pen tray 26, besides the digitizer 24, is provided to overhang from a frame of the digitizer 24, in which an input pen 25 is placed in a concave portion of the pen tray 26. The digitizer 24 is also called a "tablet".

Figure 3:
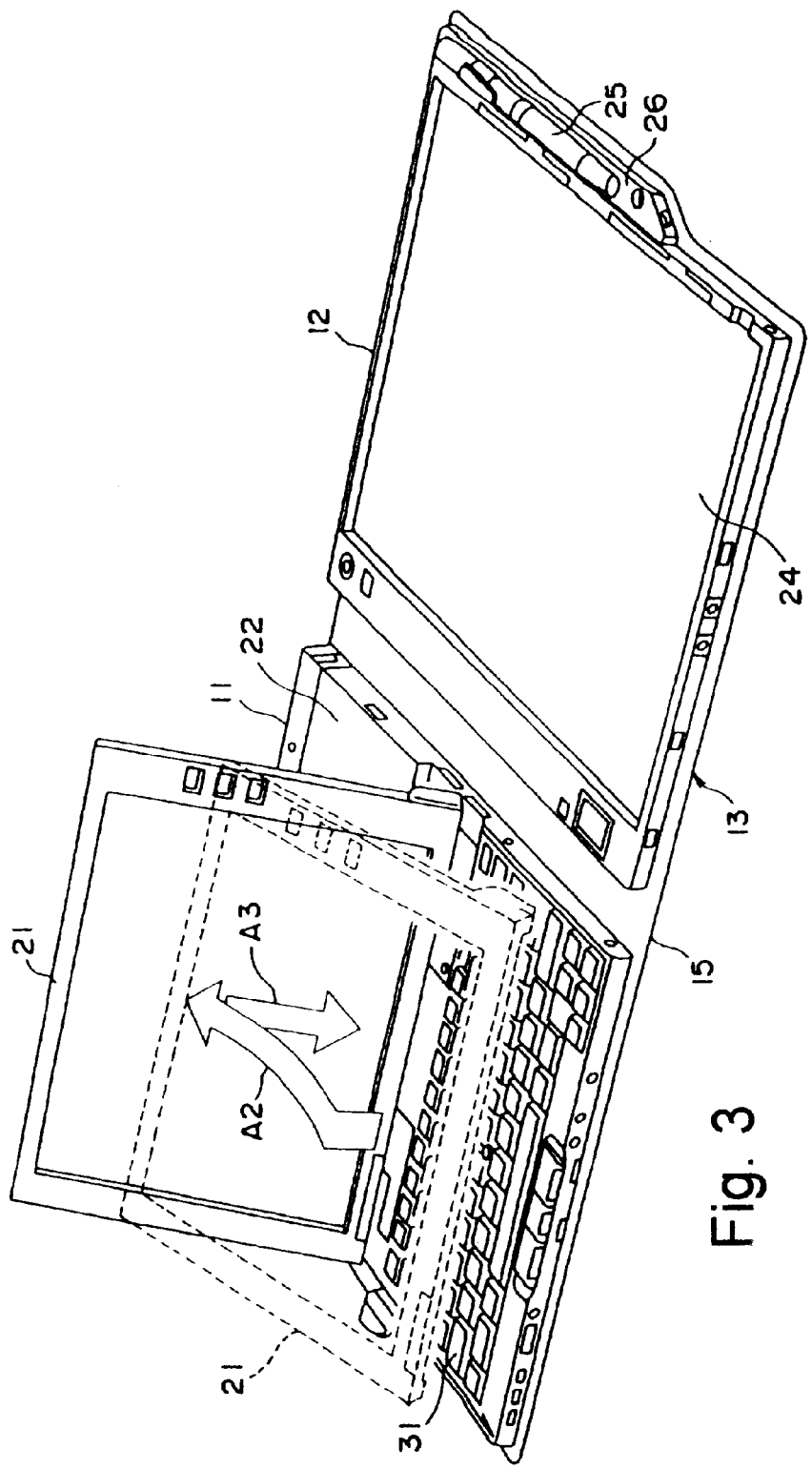
FIG. 3 is a perspective view showing the portable computer that is opened at an angle of 180°, according to a preferred embodiment.

FIG. 3 is a perspective view showing the portable computer 10 that is opened at an angle of 180°, according to a preferred embodiment. On the side of the personal computer main unit layer 11, the liquid crystal display 21 is connected to the rear side of a keyboard 31 with a folding stand, not shown. If the upper side of the liquid crystal display 21 is moved obliquely upwards (in the A2 direction), and then the lower side of the liquid crystal display 21 is moved down to the rear side of the keyboard 31 (in the A3 direction), the keyboard 31 under the liquid crystal display 21 is exposed, and the liquid crystal display 21 is made to stand behind the keyboard 31, whereby the user can make the input operation on the keyboard 31 while seeing the screen of the liquid crystal display 21.

Figure 4:
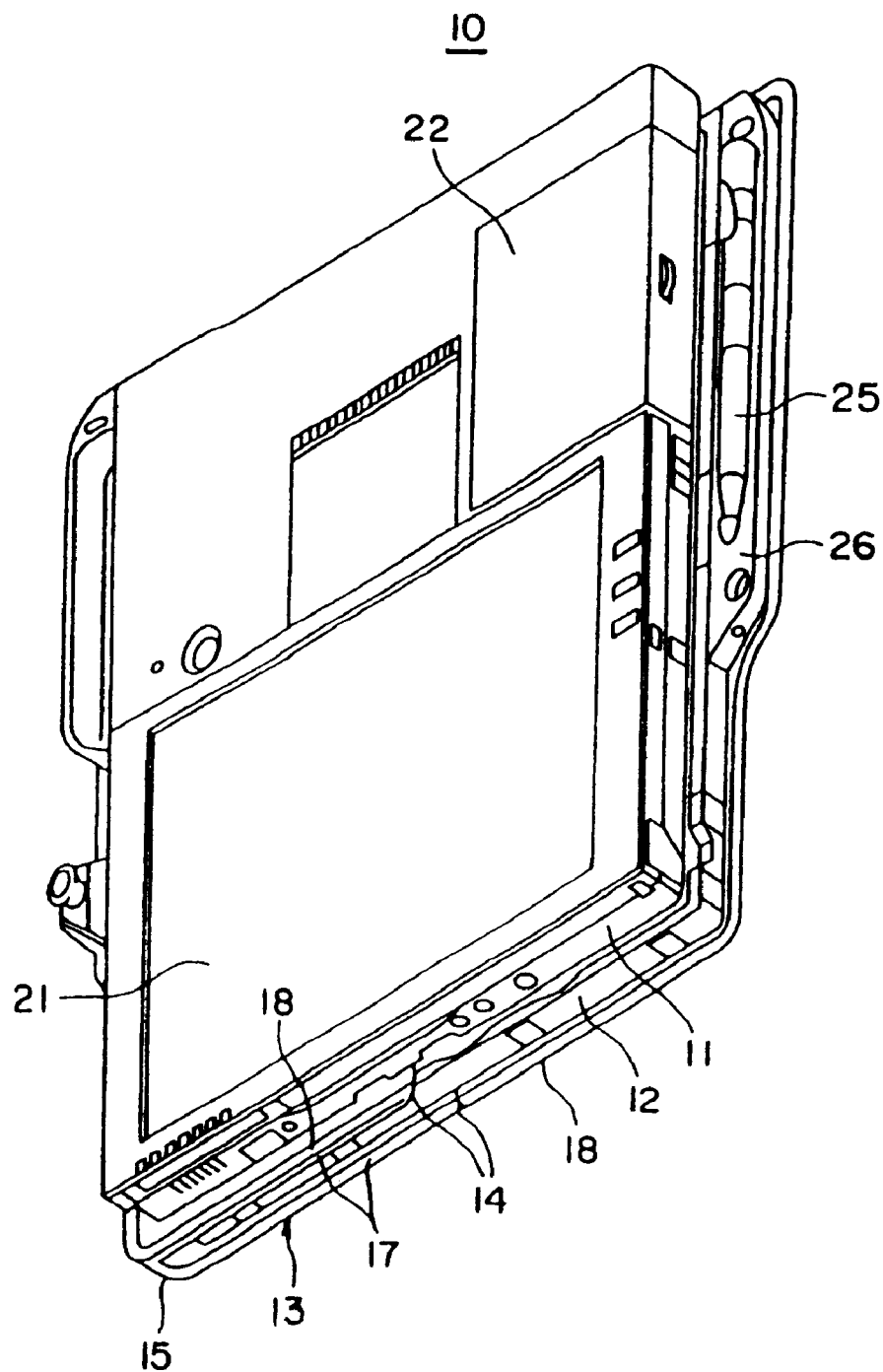
FIG. 4 is a perspective view showing a liquid crystal display that is used in a space saving state, according to a preferred embodiment.

FIG. 4 is a perspective view showing the liquid crystal display 21 in a space saving state, according to a preferred embodiment. In FIG. 4, the liquid crystal display 21 is shown in a state before standing up. In the practical use, it is necessary that the liquid crystal display 21 is made to stand to expose the keyboard 31 under the liquid crystal display 21, as shown in FIG. 3. The superposed state of FIG. 4 (hereinafter referred to as a "superposed state C2") is different from the superposed state C1, although the personal computer main unit layer 11 and the digitizer layer 12 are also superposed. That is, in the superposed state C2, the liquid crystal display 21 and the digitizer 24 are not in confrontation with each other, but both faced upwards, and the personal computer main unit layer 11 is superposed on the digitizer layer 12. To realize the superposed state C2, the free separation portion 17 is folded back under the fixed portion 18 on the back face side of the personal computer main unit layer 11 in the superposed state C2, though the free separation portion 17 covers the back face of the personal computer main unit layer 11 (i.e., the face of the personal computer main unit layer 11 opposite the face of the liquid crystal display 21 that is stored) in the superposed state C1. The free separation portion 17 covering the back face of the digitizer 24 in the superposed state C1 is also placed to cover the back face of the digitizer 24 in the superposed state C2. The pen tray 26 has a concave portion on either side of the personal computer main unit layer 11 and the digitizer layer 12, in which the input pen 25 can be placed in any concave portion at will. In FIG. 4, the input pen 25 is placed in the concave portion of the pen tray 26 on the side of the personal computer main unit layer 11. The liquid crystal display 21 also serves as a touch panel, whereby the user can input the desired data by touching an area on the surface of the liquid crystal display 21 with a top end of the input pen 25 under a certain pressure.

Figure 5:
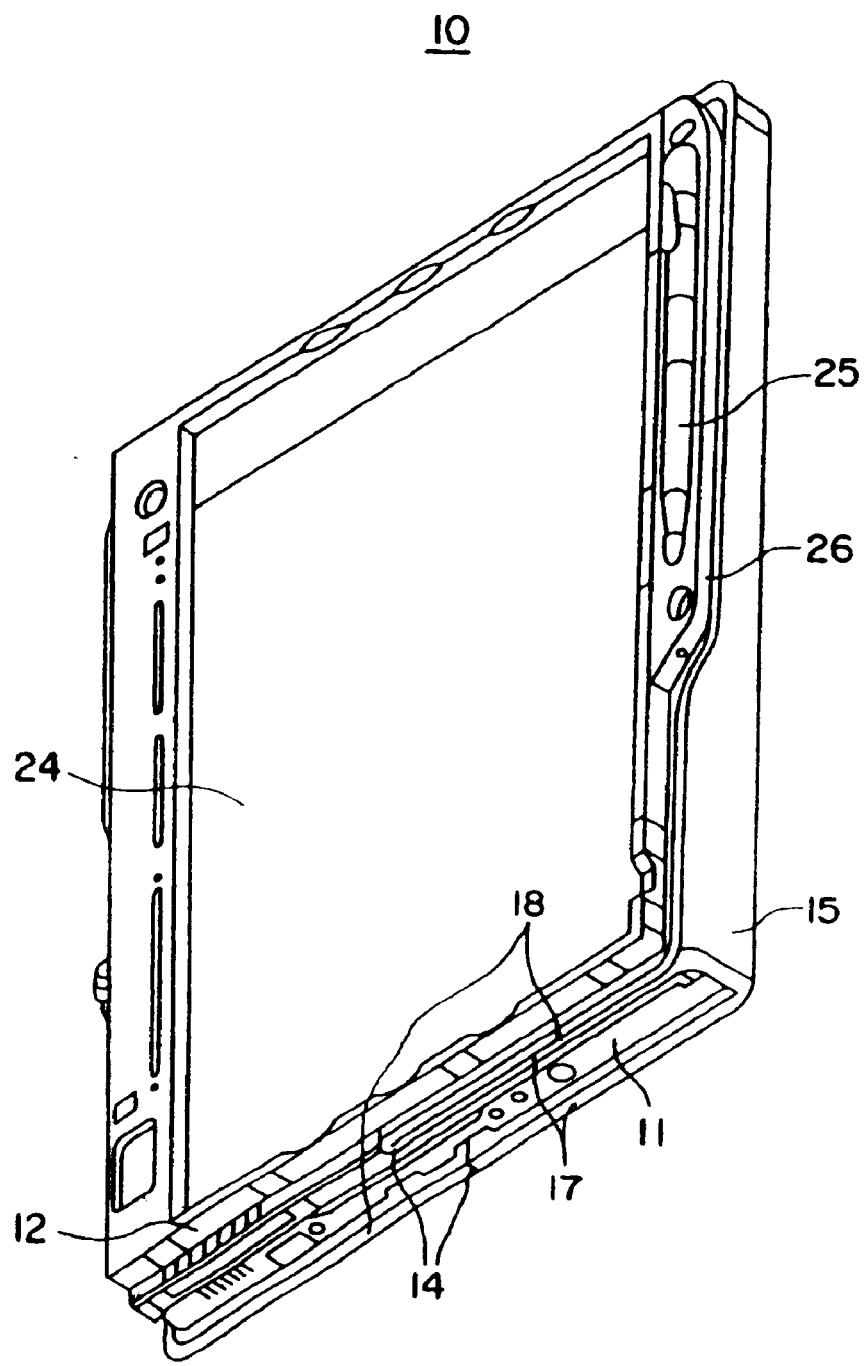
FIG. 5 is a perspective view showing a digitizer that is used in the space saving state, according to a preferred embodiment.

FIG. 5 is a perspective view of the digitizer 24 when used in a space saving state, according to a preferred embodiment. A superposed state of FIG. 5 (hereinafter 40 referred to as a "superposed state C3") is different from the superposed states C1 and C2 as previously mentioned, although the personal computer main unit layer 11 and the digitizer layer 12 are superposed. That is, in the superposed state C3, the digitizer 24 and the liquid crystal display 21 are faced upwards, and the digitizer layer 12 is superposed on the personal computer main unit layer 11. To realize the superposed state C3, the free separation portion 17 is folded back under the fixed portion 18 on the back face side of the digitizer 24 in the superposed state C3, though the free separation portion 17 covers the back face of the digitizer 24 in the superposed state C1. The free separation portion 17 covering the back face of the personal computer main unit layer 11 in the superposed state C1 is also placed to cover the back face of personal computer main unit layer 11 in the superposed state C3. The input pen 25 emits an electromagnetic wave from a tip end of the input pen for the digitizer 24, and also serves as a ball pen. When inputting a diagram from the digitizer 24, the user places a report paper type notebook on the digitizer 24, and moves the tip end of the input pen 25 on the paper. Thereby, the diagram drawn by the user is written on the paper, while the digitizer 24 receives an electromagnetic wave from the tip end of the input pen 25 via the paper, so that the data of the diagram on the paper is read into a memory of the personal computer. The input pen 25 for entering the characters on the touch panel by employing the liquid crystal display 21 as the touch panel may be different from the pen 25 for inputting the characters into the digitizer 24.

Figure 6:
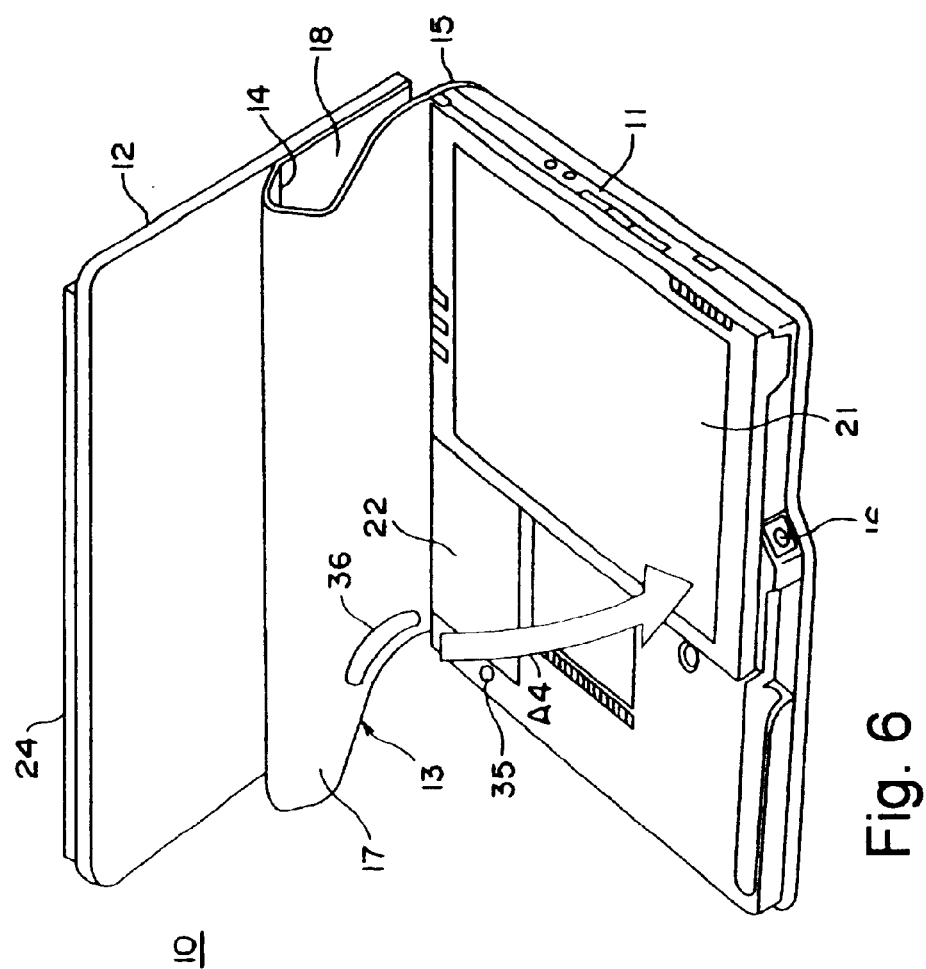
FIG. 6 is a view showing a process for transferring the digitizer from a superposed state C1 (FIG. 1) to a superposed state C3 (FIG. 5), according to a preferred embodiment.

FIG. 6 is a view showing a process for transferring the digitizer 24 from the superposed state C1 (FIG. 1) to the superposed state C3 (FIG. 5), according to a preferred embodiment. The digitizer layer 12 is moved down in the A4 direction. A photosensor 35 is disposed at a location on the side farther from the liquid crystal display 21 and slightly away from the back portion 15 on the surface of the personal computer main unit layer 11 (i.e., the face of the personal computer main unit layer 11 on the same side of the face of the liquid crystal display 21 that is stored). In the leather cover 13, the fixed portion 18 is fixed to the rear face of the digitizer layer 12 (the face opposite an input face of the digitizer 24), while the free separation portion 17 is separated from the rear face of the digitizer layer 12. The digitizer layer 12 has the digitizer 24 faced upwards so that its rear face may be laid on the personal computer main unit layer 11. At this time, a face of the free separation portion 17 (hereinafter referred to as a "first face") closely contacted with the digitizer layer 12 in the superposed state C1 is exposed. A flexible reflection member 36 has a thin aluminum foil covered with vinyl, and is shaped to be shorter in an extending direction of the folding line 14 and longer in a direction perpendicular to the extending direction of the folding line 14. And the flexible reflection member 36 is bonded with the first face of the free separation member 17 at a position where it can cover the photosensor 35 in the superposed state C3. The flexible reflection member 36, like the free separation portion 17, has the flexibility, and the free separation portion 17 maintains the full flexibility regardless of bonding with the flexible reflection member 36. Due to various degrees of bending and flexure of the free separation portion 17, the relative position between the personal computer main unit layer 11 and the digitizer layer 12 in a direction toward the stage face is not always the same, causing some dislocation, even in the superposed state C3. However, if the digitizer layer 12 sufficiently approaches the personal computer main unit layer 11, regardless of this dislocation, the flexible reflection member 36 covers an upper part of the photosensor 35.

The photosensor 35 has an infrared radiator and an infrared detector, both not shown. When the flexible reflection member 36 covers the upper part of the photosensor 35, an outgoing light beam from the infrared radiator 40 is reflected from the flexible reflection member 36, and incident upon the infrared detector 41. In this way, the superposed state C3 is detected, and the power of the liquid crystal display 21 can be turned off in the superposed state C3.

Figure 7:
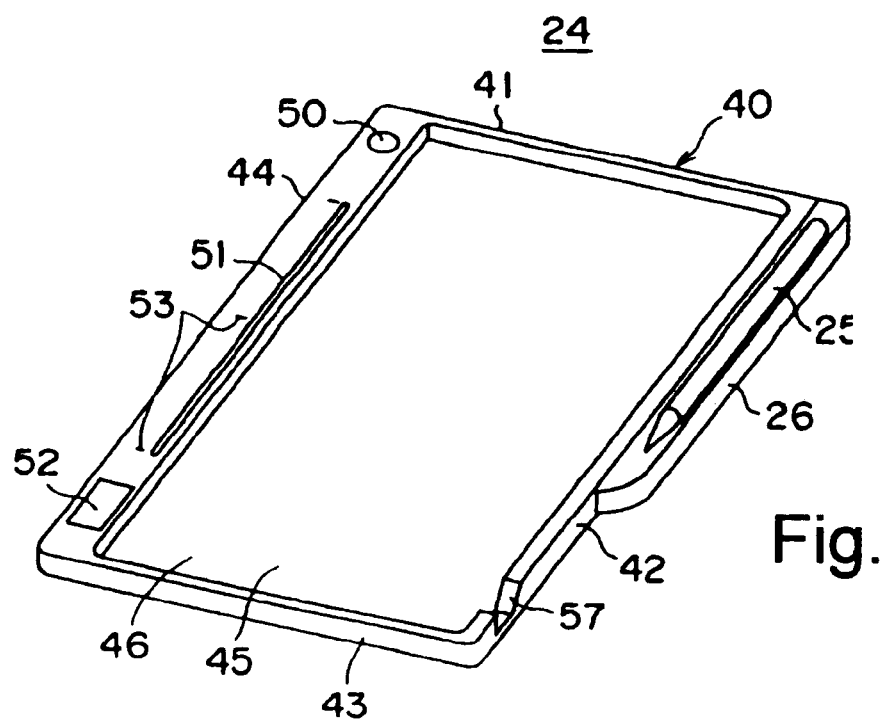
FIG. 7 is a perspective view showing the digitizer in detail, according to a preferred embodiment.

FIG. 7 is a perspective view showing the digitizer 24 in detail, according to a preferred embodiment. The digitizer 24 has a surrounding frame 40 around it as seen from the front side. The surrounding frame 40 has a rectangular contour extending longitudinally, and comprises an upper side frame portion 41, a right side frame portion 42, a lower side frame portion 43 and a left side frame portion 44 in a clockwise order. A forms set portion 45 is delineated inside the surrounding frame portion 40, and set up to have a shape and a dimension of containing a collection of forms 63 (FIG. 9) of A4 size as the paper standard internally and almost densely as will be described later. A writing sensing face 46 constitutes a bottom face of the forms set portion 45. The left side frame portion 44 has a larger width than other frame portions, and is provided with a power switch 50, a page input groove 51 and a monochrome liquid crystal display board 52 in the order from the upper side frame portion 41 to the lower side frame portion 43. The power switch 50 is only used for the digitizer 24, which has a flash memory of predetermined capacity, and enables the digitizer 24 to operate independently to save the input data even if the power supply of the personal computer main unit is stopped. The page input groove 51 extends longitudinally in the left side frame portion 44, and has a width capable of inserting a pen point of the input pen 25. A scale mark 53 is written along the page input groove 51 at predetermined positions in an extending direction of the page input groove 51, and includes three transverse lines which are located at an end of the upper side frame portion 41, at a center, and at an end of the lower side frame portion 43 in the extending direction of the page input groove 51, for example. A depth of the forms set portion 45 (i.e., the protrusion amount of the surrounding frame 40 from the bottom of the forms set portion 45) is set to be equal to the thickness of the collection of forms 63 (FIG. 8) having the maximum page number Pmax that is settable in the forms set portion 45. The end of the upper side frame portion 41, the center and the end of the lower side frame portion 43 in the extending direction of the page input groove 51 correspond to the first page, almost Pmax/2 page and the Pmax page of the collection of forms 63, respectively, and the scale mark 53 is normally attached with the corresponding page number. On the monochrome liquid crystal display board 52, a page number indicated by the user or notified from the computer main unit is displayed. A page turning side depression 57 is formed at an edge of the right side frame portion 42 on the hand of the lower side frame portion 43 to pass through the right side frame portion 42 from left to right. Accordingly, the user can touch a side face layer of the collection of forms 63 (FIG. 8) within the forms set portion 45 through the page turning side depression 57 from the outside of the right side frame portion 42.

If the user presses a predetermined position of the page input groove 51 in the extending direction with the pen point of the input pen 25, the page number corresponding to the predetermined position is notified to the personal computer main unit, and displayed on the monochrome liquid crystal display board 52. The user confirms whether or not the input page number is correct, seeing the page number displayed on the monochrome liquid crystal display board 52. When the user enters a desired page number under a pressure on the page input groove 51, the scale mark 53 can be employed as a yardstick. When the page number displayed on the monochrome liquid crystal display board 52 is different from the page number desired to input, the user is required to press another predetermined position of the page input groove 51 with the pen point of the input pen 25 again. In pressing again, the scale mark 53 is useful. That is, suppose that the user wants to enter the 17th page, but the indication on the monochrome liquid crystal display board 52 is the 20th page. Then, the user calculates mentally a difference between 17 and 20 pages, based on the display information for the 20th page, and then presses the position shifted by the difference to the upper side frame portion 41.

The user sets the collection of forms 63 in the forms set portion 45. The papers in the collection of forms 63 are attached with the page number in the overlying order. The attached page number may be written beforehand on the papers in the collection of forms 63, or the user may write beforehand the page number on the papers in the collection of forms 63, and set the collection of forms 63 in the forms set portion 45. The user opens the page to write, and presses a predetermined position of the page input groove 51 in the extending direction with the pen point of the input pen 25 to notify the page to the personal computer main unit. Thereafter, the user writes the characters at the page of the collection of forms 63 having the page number displayed on the monochrome liquid crystal display board 52, whereby the data is input into the personal computer main unit as writing into the page of the collection of forms 63 having that page number. When the user tries to open a desired page, the page turning side depression 57 is utilized.

The write sensing face 46 is scanned at a predetermined frequency to detect an electromagnetic wave from the input pen 25. Thereby, if the user sets the collection of forms 63 in the forms set portion 45, and writes into the page of the collection of forms 63, an electromagnetic wave radiated from the pen point of the input pen 25 passes through one or more papers of the collection of forms 63 to get to the write sensing face 46, so that the writing is sensed by scanning the write sensing face 46. This digitizer 24 detects the distance from the write sensing face 46 to the input pen 25 on the basis of the intensity of an incident wave from the input pen 25 to save the power of the battery, and the scanning frequency on the write sensing face 46 is changed from small to large as the distance from the write sensing face 46 to the input pen 25 is increased or decreased.

Figure 8:
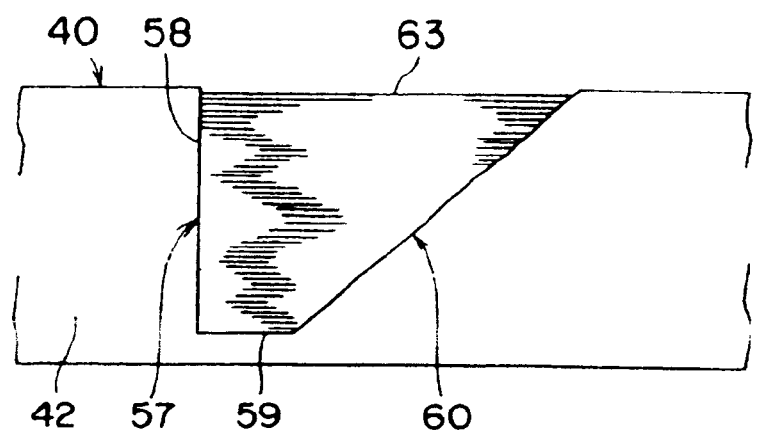
FIG. 8 is a perspective view of a page turning side depression, according to a preferred embodiment.
Figure 9:
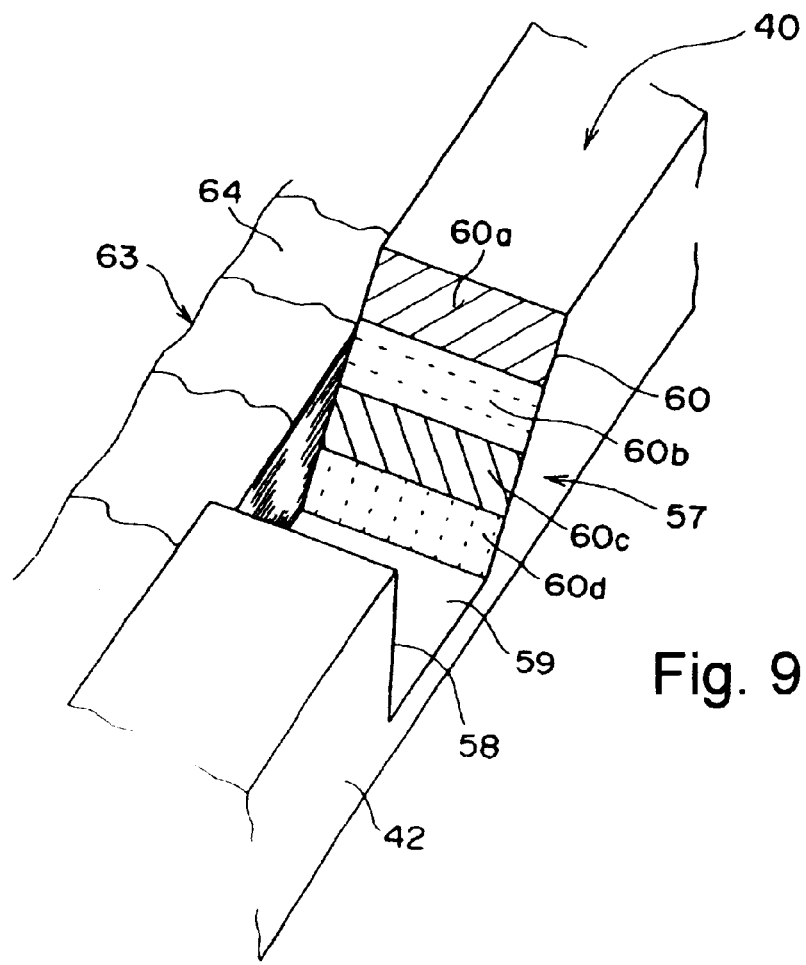
FIG. 9 is a perspective view of a page turning side depression, according to a preferred embodiment.

FIG. 8 is a view of the page turning side depression 57 as seen from the right side of the digitizer 24, according to a preferred embodiment. FIG. 9 is a perspective view of the page turning side depression 57, according to a preferred embodiment. For convenience's sake, it is supposed that the facial direction of the write sensing face 46 is a horizontal direction, the normal to the plane of the write sensing face 46 is a vertical direction, and the upper side frame portion 41 and the lower side frame portion 43 are in a forward direction and a backward direction. The page turning side depression 57 has a vertical face 58 pensile from an upper face of the right side frame portion 42, a bottom face 59 extending forwards by a predetermined length from the lower end of the vertical face 58, and a slope 60 ascending forwards at a predetermined angle from the front end of the bottom face 59 to the upper face of the right side frame portion 42. The slope 60 is partitioned into four regions of equal length in the extending direction, in which these regions are referred to as a first color partition 60a, a second color partition 60b, a third color partition 60c and a fourth color partition 60d in the order from the top, which have the colors of blue, red, green and white, respectively. The collection of forms 63 is a report paper type notebook having a certain number of papers 64 of A4 or LTR size as the paper standard piled up, in which four sides are aligned, and the upper sides are bound by an adhesive. In FIG. 9, the papers 64 are opened at a predetermined page in the collection of forms 63, and extends horizontally to intersect with a region of the second color partition 60b. The page number is printed on all the papers in the collection of forms 63 in the order from the top of the papers 64 by the manufacturing maker for the collection of forms 63, or filled by the user after purchasing the collection of forms 63 before setting it in the page turning side depression 57.

The paper in the collection of forms 63 corresponds to a predetermined range of the slope 60 in the extending direction that intersects with the paper and located at the paper thickness, as shown in FIG. 8. The slope 60 has a greater size per paper in the extending direction due to obliqueness than the vertical face 58. Accordingly, the user is more likely to choose a predetermined range of the slope 60 in the extending direction corresponding to the page to be opened (hereinafter referred to as a "target page Po"), with the higher correctness of choosing it from the entire slope 60. Further, the user determines the position of the target page Po in the total number of pages in accordance with the color coding, including the first color partition 60a, the second color partition 60b, the third color partition 60c and the four color partition 60d, and then in which color range that position is located, viz., the position in the extending direction, whereby the user can open the target page Po or nearby by turning over to the page equal to the height at the position of the slope 60 in the extending direction with a finger or the pen point of the input pen 25.

The depth of the forms set portion 45 is set up so that the total page number m of the collection of forms 63 having the thickness equal to its depth may be an integral multiple of 10 (e.g., 40, 50, 60), and it is preferable from the viewpoint of user's calculation efficiency that the number of color partitions for the slope 60 is the total page number m of the collection of forms 63 reduced by 10 or 5 (the above-mentioned numbers 40, 50 and 60 reduced by 10 are 4, 5 and 6, or reduced by 5 are 8, 10 and 12). For example, in a case where the number of color partitions is m reduced by 10, each color partition corresponds to 10 pages of the collection of forms 63, whereby the user is more likely to calculate the color partition of the slope 60 where the target page Po is located, and the position of the target page Po in the color partition. For example, in a case where the total number of pages of the collection of forms 63 is 40 pages, when the collection of forms 63 is closed without opening any page, the first page of the collection of forms 63 is almost as high as the upper face of the right side frame portion 42. It is now supposed that the target page Po is the 27th page. Also, it is supposed that there are the first color partition 60a, the second color partition 60b, the third color partition 60c and the fourth color partition 60d, namely, four color partitions in total, on the slope 60. Then, the 27th page lies within the third color partition 60c, and assuming that from the upper end to the lower end of the third color partition 60c is 1, the user can judge that the 27th page is located about ¾ from the upper end. In this way, the user turns over to the page of the collection of forms 63 as high as the position judged by the user on the slope 60.

When firstly turned over, the opened page Px is not the target page Po, but usually near the target page Po. However, since Px is near the target page Po, the user only turns over a few pages to open the page Po.

Figure 10:
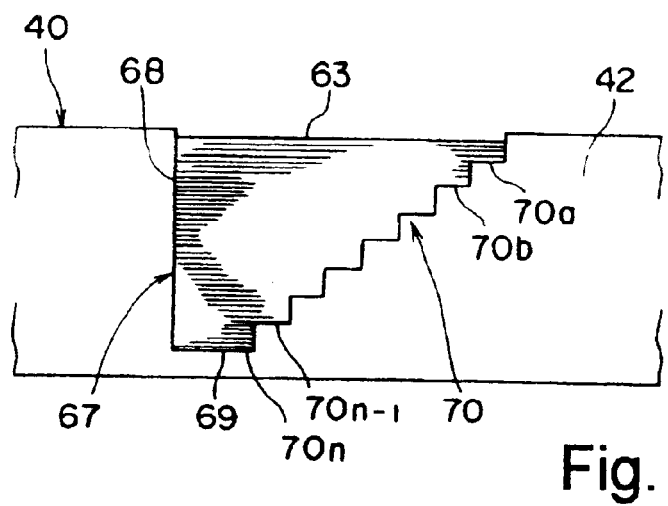
FIG. 10 is a view of the page turning side depression that is used instead of the page turning side depression of FIG. 8 as seen from the right side of the digitizer, according to a preferred embodiment.
Figure 11:
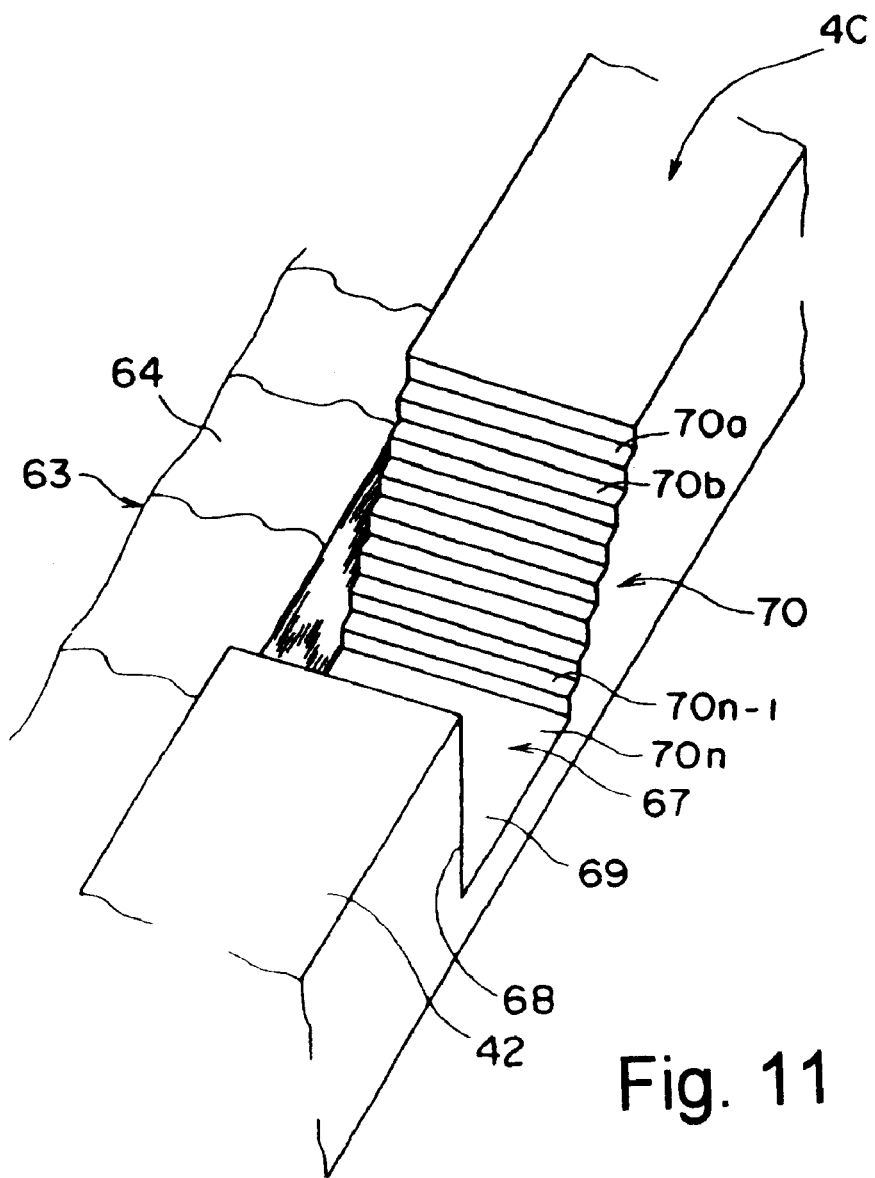
FIG. 11 is a perspective view of the page turning side depression, according to a preferred embodiment; and, FIG. 12 is a schematic view showing a monochrome liquid crystal display board disposed adjacent to the page turning side depression on the opposite side of the collection of forms, according to a preferred embodiment.

FIG. 10 is a view showing a page turning side depression 67, according to a preferred embodiment that is used instead of the page turning side depression 57 of FIG. 8, as seen from the right side of the digitizer 24. FIG. 11 is a perspective view of the page turning side depression 67, according to a preferred embodiment. The page turning side depression 67 has a vertical face 68 pensile from an upper face of the right side frame portion 42, a bottom face 69 extending forwards by a predetermined length from the lower end of the vertical face 68, and a step structure face 70 ascending forwards at a predetermined angle from the front end of the bottom face 69 to the upper face of the right side frame portion 42. The step structure face 70 has horizontal and vertical steps alternately in the extending direction, and the bottom face 69 also serves as a horizontal step at the lowermost part of the step structure face 70. These horizontal steps of the step structure face 70 are designated as 70a, 70b, . . . , 70n−1, and 70n in the order from the horizontal step as high as the upper face of the right side frame portion 42 to the horizontal step at the lowermost part (i.e., bottom face 69). The horizontal steps 70a, 70b, . . . , 70n may have distinguishable colors.

The total page number m of the collection of forms 63 having the thickness equal to the depth of the forms set portion 45 is made an integral multiple of 10 (e.g., 40, 50, 60), and it is preferable from the viewpoint of user's mental calculation efficiency that the total number n of horizontal steps for the step structure face 70 is equal to the total page number m of the collection of forms 63 reduced by 10 or 5 (e.g., the above-mentioned numerical values reduced by 10 are 4, 5 and 6, or reduced by 5 are 8, 10 and 12).

For each page of the collection of forms 63, a horizontal step Sa is defined as the highest horizontal step among one or more horizontal steps in the step structure face 70 at or below the height of the page, and a horizontal step Sb is defined as the lowest horizontal step among one or more horizontal steps in the step structure face 70 above the height of the page. The horizontal steps Sa and Sb may be adjacent in the step structure face 70, in which the horizontal step Sa that is determined for each page of the collection of forms 63 is any one of the horizontal steps 70a, 70b, . . . , 70n. Since the horizontal steps Sa and Sb are determined for each page, the user judges what are the horizontal steps Sa and Sb for the target page, and turns over to the page belonging to the range of height from the horizontal steps Sa to Sb determined on the basis of the judgement. For example, in a case where the total number of pages of the collection of forms 63 is 40 pages, assuming that n is equal to 8, each of the horizontal steps 70a, 70b, . . . , 70n has five pages for Sa in the collection of forms 63, and if the target page Po is the 18th page, the user mentally calculates 5×3<18<5×4, in which the target page Po lies at the height between the step structure face 70c and the step structure face 70d. Accordingly, the user estimates the page at the height between the step structure face 70c and the step structure face 70d as seen from the side face of the step structure face 70, and turns over to the page. As firstly turned over, the target page Po is rarely opened, and the page Px to be firstly opened is usually different from the target page Po. However, since Px is appropriately near Po, the user can open the target page Po efficiently by turning over the pages before or after by a difference between Px and Po.

Figure 12A:
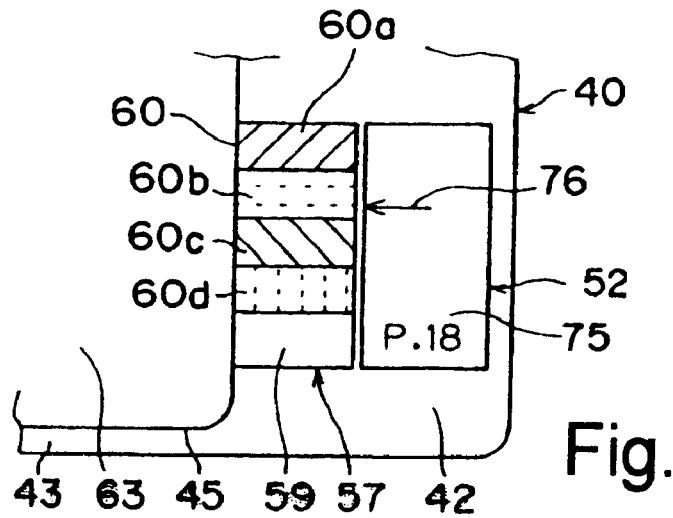
Figure 12B:
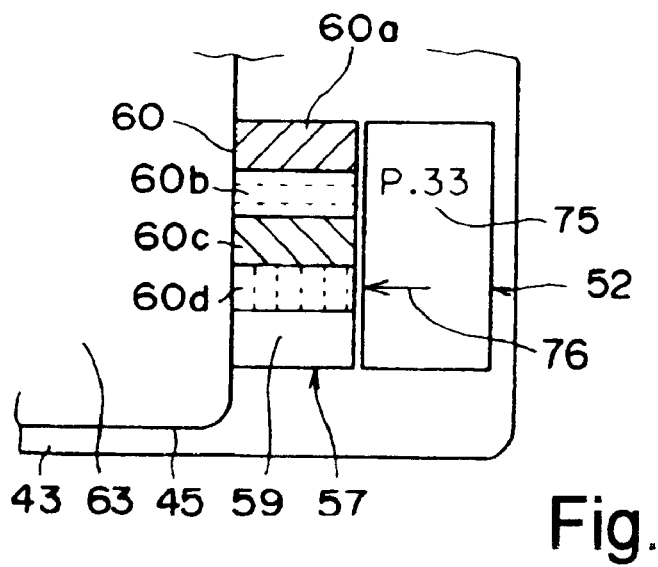

FIG. 12 is a schematic view showing the monochrome liquid crystal display board 52 disposed adjacent to the page turning side depression 57 on the opposite side of the collection of forms 63, according to a preferred embodiment. On the schematic view of FIG. 12, not only the monochrome liquid crystal display board 52 but also the power switch 50 and the page input groove 51 are disposed on the upper face of the right side frame portion 42, whereby the right side frame portion 42 is formed sufficiently widely. The page turning side depression 57 is set to the width permitting the user's finger to be inserted therein. On the monochrome liquid crystal display board 52, a page number indication 75 and an indication mark 76 indicating the position of the slope 60 in the extending direction at the height corresponding to the page number indication 75 are displayed. In an example of FIG. 12, it is supposed that the total number of pages of the collection of forms 63 is 40 pages, and the number of color partitions for the slope 60 is four. Each of the first color partition 60a, the second color partition 60b, the third color partition 60c and the fourth color partition 60d corresponds to 10 pages of the collection of forms 63. To suppress the area of the monochrome liquid crystal display board 52 to the minimum, when the indication mark 76 is located forward from the center of the liquid crystal display board 52 in the longitudinal direction (i.e., vertical direction of FIG. 12), the page number indication 75 appears on the latter half part of the liquid crystal display board 52. On the other hand, when the indication mark 76 is located rearward from the center of the liquid crystal display board 52 in the longitudinal direction, the page number indication 75 appears on the former half part of the liquid crystal display board 52. FIGS. 12A and 12B shows the position of the indication mark 76 in the case where the 18th page and 33rd page are displayed as the page number indication 75 when the entire range of the slope 60 in the extending direction is 40 pages. At the 18th page, the indication mark 76 lies forward from the center of the liquid crystal display board 52 in the longitudinal direction, while at the 33rd page, the indication mark 76 lies rearward from the center of the liquid crystal display board 52 in the longitudinal direction. As previously described, the user inserts the pen point of the input pen 25 into the page input groove 51, and presses a predetermined position of the page input groove 51 in the extending direction, whereby the page number indication 75 corresponding to the predetermined position in the extending direction is displayed on the liquid crystal display board 52. Accordingly, the user inputs the target page in the page input groove 51, so that the page number indication 75 and the indication mark 76 are displayed on the liquid crystal display board 52. The user turns over the pages, employing the finger or the pen point of the input pen 25, and opens the target page of the forms 64 as high as the position of the slope 60 in the extending direction that is indicated by the indication mark 76.

In the example of FIG. 12, the page turning side depression 57 of FIGS. 8 and 9 is shown. However, the page turning side depression 67 and the monochrome liquid crystal display board 52 may be juxtaposed with the right side frame portion 42, employing the page turning side depression 67 of FIGS. 10 and 12, instead of the page turning side depression 57.

In the above description, the page number displayed as the page number indication 75 on the right side frame portion 42 is designated by the user pressing the predetermined position of the page input groove 51 in the extending direction with the pen point of the input pen 25. However, in addition to the user's designation, the page number notified from the personal computer main unit portion may be displayed as the page number indication 75 on the monochrome liquid crystal display board 52. For example, it is supposed that the user writes into a plurality of pages in the collection of forms 63, and makes the retrieval for all the stored data including the content of writings at each written page stored in a storage device of the personal computer main unit portion, corresponding to each written page. In this case, the page number at which the retrieval word is located is notified from the personal computer main unit to the digitizer 24, and the notified page number is displayed as the page number indication 75 on the monochrome liquid crystal display board 52. Besides, the indication mark 76 on the monochrome liquid crystal display board 52 appears at the position of the slope 60 in the extending direction in the page turning side depression 57 corresponding to the page number of the page number indication 75 or the position indicating the horizontal step in the step structure face 70 in the page turning side depression 67. In this way, the user can turn over the pages on the basis of the position on the slope 60 in the extending direction in the page turning side depression 57 that is indicated by the indication mark 76 or the horizontal step of the step structure face 70 in the page turning side depression 67, and can open the target page Po containing the retrieval word rapidly and efficiently.

The user can appropriately set the total page number of the collection of forms 63 set in the forms set portion 45 and the thickness of each paper. The total page number or the thickness of paper may be different depending on the collection of forms 63. The user inputs the total page number of the collection of forms 63 and the thickness of paper from the keyboard 31 of the personal computer main unit, for example. The indication mark 76 of the monochrome liquid crystal display board 52 appears at the position of the slope 60 in the extending direction corresponding to the page number of the page number indication 75, on the basis of the total page number of the collection of forms 63 set up by the user and the thickness of each paper. For example, in a case where there are the first and second collection of forms 63 having the same thickness of paper and the different total page numbers, 40 pages or 30 pages, and the entire range of the slope 60 in the extending direction is 40 pages, in the first collection of forms 63, the indication marks 76 for the first page, the 20th page and the 30th page appear at the front end of the first color partition 60a, at the boundary between the second color partition 60b and the third color partition 60c, and at the boundary between the third color partition 60c and the fourth color partition 60d, respectively, while in the second collection of forms 63, the indication marks 76 for the first page, the 20th page and the 30th page appear at the boundary between the first color partition 60a and the second color partition 60b, at the boundary between the third color partition 60c and the fourth color partition 60d, and at the rear end of the fourth color partition 60d, respectively. Because the thickness of paper is less different depending on the collection of forms 63, the user setting for the thickness of paper is omitted, and the user setting for the total page number of the collection of forms 63 is only made. The digitizer 24 is provided with the page turning side face depressions 57 and 67, which can be utilized without regard to the digitizer 24. That is, in FIG. 8, requisite elements related with the digitizer 24 are removed, and remaining elements (40, 45, 51, 52, 57, 67 (67 instead of 57) can be utilized without regard to the digitizer 24. In this case, the items settable in the forms set portion 45 are not limited to the writable collection of forms, but may be the book with the pages only turned without specifically writing. The surrounding frame 40 is placed on a desk or table while delineating the forms set portion 45, in which a book having a certain thickness such as an encyclopedia or the collection of forms is set in the forms set portion 45. And when the book or collection of forms is opened at a desired page, the page turning side face depressions 57 and 67 as well as the monochrome liquid crystal display board 52 on which the page number indication 75 and the indication mark 76 are provided are employed.

In the present invention, since the ascent section has the extensive range identifying means for identifying the range in the extending direction, while ascending almost obliquely from the lower end to the upper end in the layer direction of the thickened side face, in opening a desired page of the collection of forms, the user can rely on the extensive range identifying means corresponding to the desired page to open the desired page efficiently.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. The digitizer comprising:

a stage portion for receiving an assembly of papers which are attached with a page number in an overlying order and bundled to be freely opened at any page number, a data detecting portion for detecting contents of writing as data corresponding to the page number of a page when a user writes into the page being opened in said assembly of papers on said stage portion, a protrusion member adjacent to a lateral face of thickness for said assembly of papers that are freely turned over on said stage portion, said protrusion member having an ascent section ascending almost obliquely to a layer direction of said lateral face of thickness from a lower end to an upper end in the layer direction of said lateral face of thickness, and said ascent section is provided with an extensive range identifying unit for identifying a range in an extending direction of said ascent section, a display portion disposed adjacent to said protrusion member on the opposite side of said stage portion to said protrusion member as seen from an upper face of said stage portion, said display portion displaying a page number and an indication mark indicating the position of said ascent section in the extending direction which is almost as high as the page with said page number, a page number input portion for enabling the user to input the page number; and a display control unit for displaying the page number input into said page number input portion and a corresponding indication mark on said display portion.

2. The digitizer according to claim 1, wherein said ascent section is a slope ascending monotonously from a stage face of said stage portion, and said extensional range identifying unit is a color for each range on the slope.

3. The digitizer according to claim 1, wherein said ascent portion has a step structure ascending monotonously from a stage face of said stage portion, and said extensive range identifying unit is a horizontal step of said step structure.

4. The digitizer according to claim 1, further comprising a page number indication input portion which accepts an indication of the page number from a computer main unit, and display control means for displaying the page number input into said page number indication input portion and a corresponding indication mark on said display portion.

5. The digitizer according to claim 1, further comprising a set value input portion for enabling the user to input a total number of pages for an assembly of papers laid on said stage portion as a set value, wherein said display control means controls the position of an indication mark on said display portion, on the basis of the set value for the total number of pages which the user inputs into said set value input portion.

6. The digitizer according to claim 4, further comprising a set value input portion for enabling the user to input a total number of pages for an assembly of papers laid on said stage portion as a set value, wherein said display control means controls the position of an indication mark on said display portion, on the basis of the set value for the total number of pages which the user inputs into said set value input portion.

* * * * *